(12) United States Patent
Xu

(10) Patent No.: US 10,125,517 B2
(45) Date of Patent: Nov. 13, 2018

(54) FOLDING VEHICLE ROOF TOP TENT

(71) Applicant: Mengfei Xu, Zhejiang (CN)

(72) Inventor: Mengfei Xu, Zhejiang (CN)

(*) Notice: Subject to any disclaimer, the term of this patent is extended or adjusted under 35 U.S.C. 154(b) by 0 days.

(21) Appl. No.: 15/323,413

(22) PCT Filed: Jan. 8, 2016

(86) PCT No.: PCT/CN2016/070455
§ 371 (c)(1),
(2) Date: Dec. 31, 2016

(87) PCT Pub. No.: WO2017/004972
PCT Pub. Date: Jan. 12, 2017

(65) Prior Publication Data
US 2018/0106065 A1    Apr. 19, 2018

(30) Foreign Application Priority Data
Jul. 6, 2015   (CN) ..................... 2015 2 0493442 U

(51) Int. Cl.
*E04H 15/06* (2006.01)
*E04H 15/48* (2006.01)
*B60P 3/34* (2006.01)

(52) U.S. Cl.
CPC ............... *E04H 15/48* (2013.01); *B60P 3/34* (2013.01); *E04H 15/06* (2013.01)

(58) Field of Classification Search
CPC ......... E04H 15/06; E04H 15/48; E04H 15/02; B60P 3/34; B60P 3/07

USPC ......... 135/88.07, 88.13–88.14, 88.16–88.17, 135/132–134, 137–138; 296/159, 296/160–163, 173–174
See application file for complete search history.

(56) References Cited

U.S. PATENT DOCUMENTS

| | | | | |
|---|---|---|---|---|
| 3,323,827 A * | 6/1967 | Lundby | ................... | B60P 3/341 135/116 |
| 3,375,836 A * | 4/1968 | Domeneghetti | ........ | E04H 15/06 135/116 |
| 3,712,316 A * | 1/1973 | Leonard | ................... | B60P 3/38 135/116 |
| 4,176,873 A * | 12/1979 | Barr | ........................ | B60P 3/38 296/156 |
| 4,396,030 A * | 8/1983 | Ferguson | ................ | E04H 15/06 135/88.17 |

(Continued)

*Primary Examiner* — Winnie Yip
(74) *Attorney, Agent, or Firm* — Global IP Services; Tianhua Gu

(57) ABSTRACT

A folding vehicle roof top tent. The fixed base is in a ladder shape and fixed to the vehicle roof, and one end of the fixed base is connected to one end of the movable base which is in a ladder shape by a pair of the connection block assemblies. Each of the connection block assembly comprises a first connection block connected to the fixed base, a second connection block connected to the movable base, and a main connection block, both the first connection block and the second connection block are hinged to the main connection block. The support is hinged to the main connection block. The tent cloth covers the support in a fixed manner, and bottom edges of the tent cloth are fixedly connected to the fixed base and the movable base simultaneously. One end of the telescopic ladder is hinged to the other end of the movable base.

3 Claims, 3 Drawing Sheets

(56) References Cited

U.S. PATENT DOCUMENTS

| | | | | |
|---|---|---|---|---|
| 4,462,631 A | * | 7/1984 | Lange | B60P 3/38 |
| | | | | 135/88.16 |
| 4,522,441 A | * | 6/1985 | Allison | B60P 3/38 |
| | | | | 135/88.17 |
| 4,830,036 A | * | 5/1989 | Sanders | E04H 15/06 |
| | | | | 135/132 |
| 5,135,278 A | * | 8/1992 | Kauffman | B60P 3/34 |
| | | | | 296/170 |
| 6,035,875 A | * | 3/2000 | Chen | E04H 15/06 |
| | | | | 135/88.05 |
| 9,580,928 B1 | * | 2/2017 | Currid | E04H 15/644 |
| 2010/0263698 A1 | * | 10/2010 | Chiu | E04H 15/06 |
| | | | | 135/88.17 |
| 2015/0368926 A1 | * | 12/2015 | Herrera | E04H 15/38 |
| | | | | 135/133 |

* cited by examiner

FOLDING VEHICLE ROOF TOP TENT

CROSS REFERENCE TO RELATED PATENT APPLICATION

The present application is the U.S. national stage of PCT/CN2016/070455 filed on Jan. 8, 2016, which claims the priority of the Chinese patent application No. 2015204934424 filed on Jul. 6, 2015, which applications are incorporated herein by reference.

TECHNICAL FIELD

The present application relates to the field of vehicular equipment, and specifically refers to a folding vehicle roof top tent.

BACKGROUND

Folding vehicle roof top tent, known as "home on a vehicle", refers to a tent that can be set up on a vehicle roof top, which will not be easily affected by moisture from the ground and entry of foreign objects, thus bringing comfortable and convenient user experiences. With the increase in the number of private vehicles, self-driving trip becomes a new way of tourism. The demand for the vehicle roof top tent is also increasing gradually.

Since a family vehicle has smaller length, width, and height than those of a SUV, if a common one-piece vehicle roof top tent is set up on a family vehicle, the base of the tent will extend beyond the vehicle body, resulting in adverse influences on driving safety.

SUMMARY OF THE APPLICATION

In view of this, the present application is aimed at providing a safe and reliable folding vehicle roof top tent with a simple structure, which is easy to fold and unfold and suitable for vehicles of various types.

Based on the above-mentioned aim, the present application provides a folding vehicle roof top tent, comprising: a movable base, a fixed base, a support, tent cloth, connection block assemblies, and a telescopic ladder. The fixed base is in a ladder shape and fixed to the vehicle roof, and one end of the fixed base is connected to one end of the movable base which is in a ladder shape by a pair of the connection block assemblies. Each connection block assembly comprises a first connection block connected to the fixed base, a second connection block connected to the movable base, and a main connection block, wherein both the first connection block and the second connection block are hinged to the main connection block. The support is hinged to the main connection block. The tent cloth covers the support in a fixed manner, and bottom edges of the tent cloth are fixedly connected to the fixed base and the movable base simultaneously. One end of the telescopic ladder is hinged to the other end of the movable base.

Preferably, a first stop mechanism is provided at the position where the main connection block is hinged to the first connection block and the second connection block, for limiting a maximum angle formed between the main connection block, the first connection block, and the second connection block in an unfolded state.

Preferably, the support comprises at least three U-shaped aluminium-alloy tubes; a support mounting base is provided on the main connection block; and an end portion of the U-shaped aluminium-alloy tube is hinged to the support mounting base through a plastic sleeve.

Preferably, the other end of the movable base is provided with a retaining piece, and one end of the telescopic ladder is hinged to the retaining piece; and the retaining piece is further provided with a second stop mechanism for limiting a maximum angle between the telescopic ladder and the movable base in the unfolded state.

Preferably, outer frames of the movable base and the fixed base are provided with a plurality of overflow holes.

Preferably, the fixed base is fixed on the vehicle roof top through a fixture; the fixture is provided with a sliding rail; and the fixed base can slide on the sliding rail and can be fixed in a position by a lock mechanism.

Preferably, both the first connection block and the second connection block are provided with a telescopic mechanism for adjusting the length of the tent in the unfolded state.

It can be seen from the description above that the folding vehicle roof top tent provided in the present application realizes the switching between the folding and unfolding states by providing the movable base, the fixed base, and the connection block assemblies. Simply by pulling or pushing the telescopic ladder, the above-mentioned folding process can be realized quickly. The present application has a simple structure with easy and quick folding and unfolding processes, can meet the load-bearing requirements, has a long service life, and is suitable for vehicles of various types.

DESCRIPTION OF THE DRAWINGS

In order to describe the technical solutions in embodiments of the present invention or the prior art more clearly, the figures to be used in the description of the embodiments or the prior art will be simply introduced below. Apparently, the accompanying drawings in the following description show merely some embodiments of the present invention, and a person of ordinary skill in the art may still derive other drawings from these accompanying drawings without creative efforts.

DETAILED DESCRIPTION OF THE DISCLOSED EMBODIMENTS

The present application is further described below in detail in conjunction with specific embodiments and with reference to the drawings, such that the objects, technical solutions and advantages of the present application become clearer.

Figure 1:
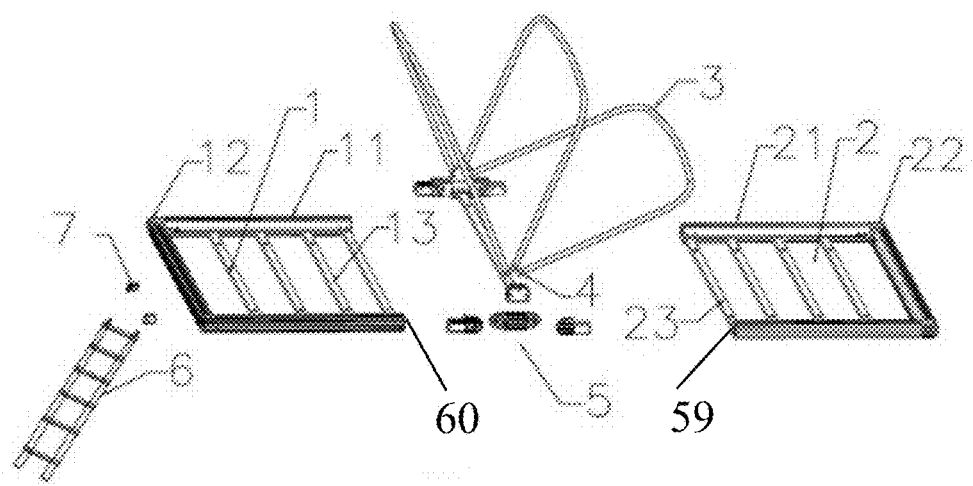
FIG. 1 is a structural explosion view of a folding vehicle roof top tent of an embodiment of the present application.

Referring to FIG. 1, the figure is a structural explosion view of the folding vehicle roof top tent of the embodiment of the present application.

The present application provides a folding vehicle roof top tent, comprising: a movable base 1, a fixed base 2, a support 3, tent cloth (not shown in FIG. 1), connection block assemblies 5, and an telescopic ladder 6.

Both the movable base 1 and the fixed base 2 are in a ladder shape, namely, a structure having an outer frame and a plurality of supporting beams provided in parallel inside the outer frame. The fixed base 2 is fixedly mounted on the vehicle roof top, one end of which is connected to one end of the movable base 1 by a pair of the connection block assemblies 5. Preferably, referring to FIG. 1, the movable base 1 comprises three first outer frame beams and a plurality of first supporting beams 13, wherein the three first outer frame beams constitute a U-shaped outer frame 11 for the movable base through two first plastic connecting members 12, and the plurality of first supporting beams 13 are spaced at a regular interval and provided in parallel between two parallel first outer frame beams of the outer frame 11 for the movable base. The fixed base 2 comprises three second outer frame beams and a plurality of second supporting beams 23, wherein the three second outer frame beams constitute a U-shaped outer frame 21 for the fixed base through two second plastic connecting members 22, and the plurality of second supporting beams 23 are spaced at a regular interval and provided in parallel between two parallel second outer frame beams of the outer frame 21 for the fixed base. Further, the outer frame 11 for the movable base and the outer frame 21 for the fixed base are both provided with a plurality of overflow holes for discharging collected water caused by weather or improper use.

Figure 2:
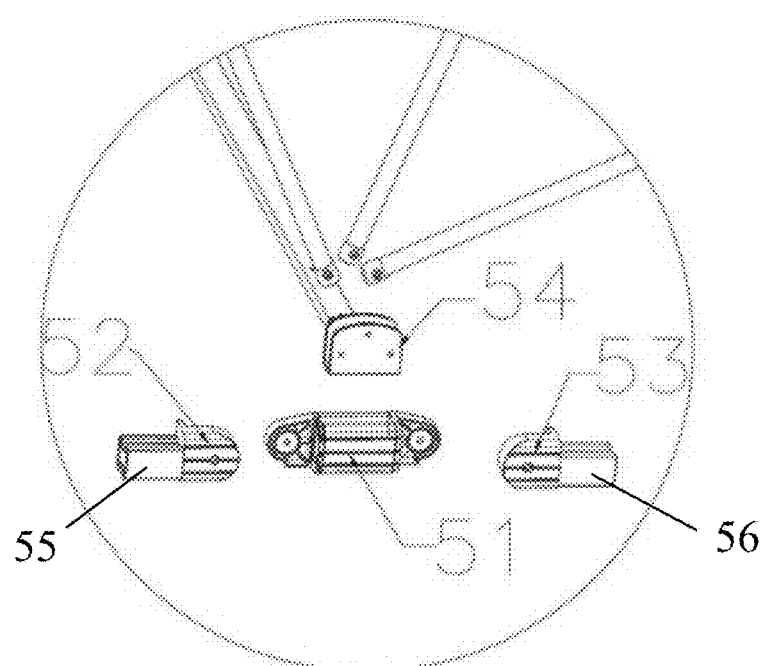
FIG. 2 is a structural explosion view of a connection block assembly of the embodiment of the present application.
Figure 3:
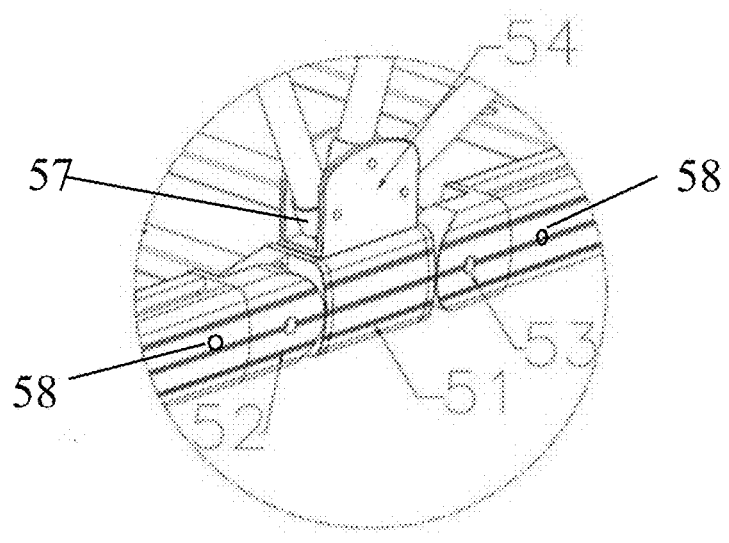
FIG. 3 is an assembly drawing of the connection block assembly of the embodiment of the present application.

Referring to FIG. 2 and FIG. 3, provided are the structural explosion view and the assembly drawing of the connection block assembly respectively. The connection block assembly 5 comprises a first connection block 53, a second connection block 52, and a main connection block 51, wherein the first connection block 53 is connected to the fixed base 2, the second connection block 52 is connected to the movable base 1, and both the first connection block 53 and the second connection block 52 are hinged to the main connection block 51. The support 3 is hinged to the main connection block 51; the main connection block 51 is further provided with a support mounting base 54; and the support 3 is hinged to the support mounting base 54.

The support 3 is the main framework portion of the tent. The tent cloth is made of a water-proof and tear-resistant material, and covers the support 3 in a fixed manner. At the same time, bottom edges of the tent cloth can be fixed and connected along outer frame edges of the fixed base 2 and the movable base 1 simultaneously, such that the tent cloth can be folded and unfolded along with the support 3 and the movable base 1. Preferably, referring to FIGS. 1, 2, 3, the support 3 comprises at least three U-shaped aluminium-alloy tubes, wherein the U-shaped aluminium-alloy tube can be formed by bending a single aluminium-alloy tube, or by connecting several aluminium-alloy tubes together. An end portion of each U-shaped aluminium-alloy tube is hinged to the support mounting base 54 through a plastic sleeve 57. The friction during movement of the support 3 can be reduced by the plastic sleeve 57, thus facilitating the flexibility in its rotation. In other embodiments, the support 3 can also adopt other structures, such as an umbrella-typed support or an assembled support.

One end of the telescopic ladder 6 is hinged to the other end of the movable base 1. Preferably, the other end of the movable base is provided with a retaining piece 7, and one end of the telescopic ladder 6 is hinged to the retaining piece 7. The telescopic ladder 6 can also stretch out and retract so as to adapt to various types of vehicle.

With regard to the above-mentioned embodiments, through the connection of the pair of the connection block assemblies 5, a hinged connection between the movable base 1 and the fixed base 2 is realized. The fixed base 2 is fixed on the vehicle roof top; referring to FIG. 4, in an unfolded state, the movable base 1 is adjusted and rotated, such that the movable base is positioned in the same horizontal plane as the fixed base 2; and referring to FIG. 5, in a folded state, the movable base 1 is adjusted and rotated, such that the movable base is in a stacked position with the fixed base 2. In the unfolded state, the movable base 1 extends beyond the vehicle body, and the telescopic ladder 6 serves as a support for the movable base 1 in addition to a tool for entering the tent. In practical use, quick folding and unfolding of the tent can be achieved by pulling the telescopic ladder 6. In particular, by pulling or pushing the telescopic ladder 6, the movable base 1 is driven to rotate, and then the movable base 1 drives the tent cloth 4 provided on the movable base assembly 1 to unfold or fold, and simultaneously drives the support 3 connected to the tent cloth 4 to unfold or fold, thus completing the whole folding and unfolding processes of the tent.

Figure 4:
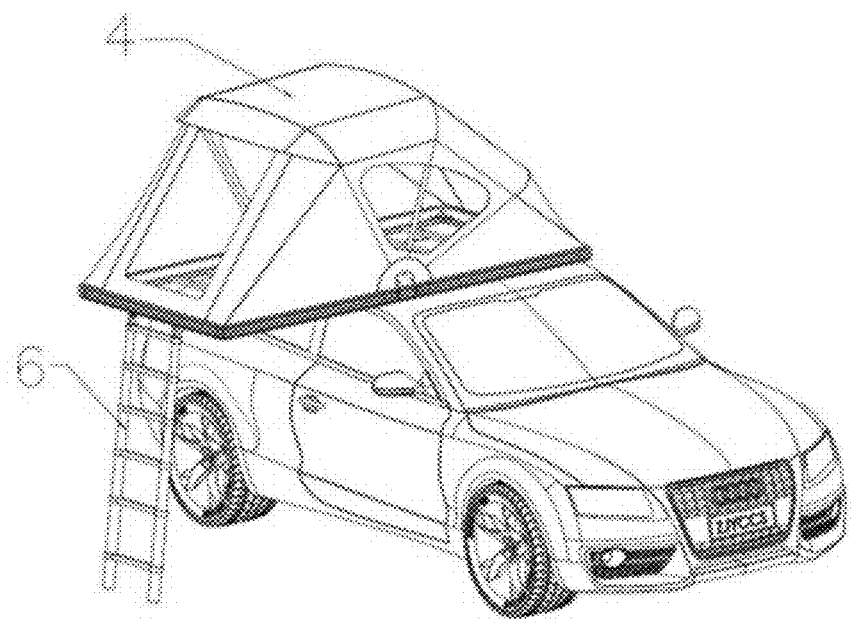
FIG. 4 is a schematic view of the folding vehicle roof top tent of the embodiment of the present application in an unfolded state.
Figure 5:
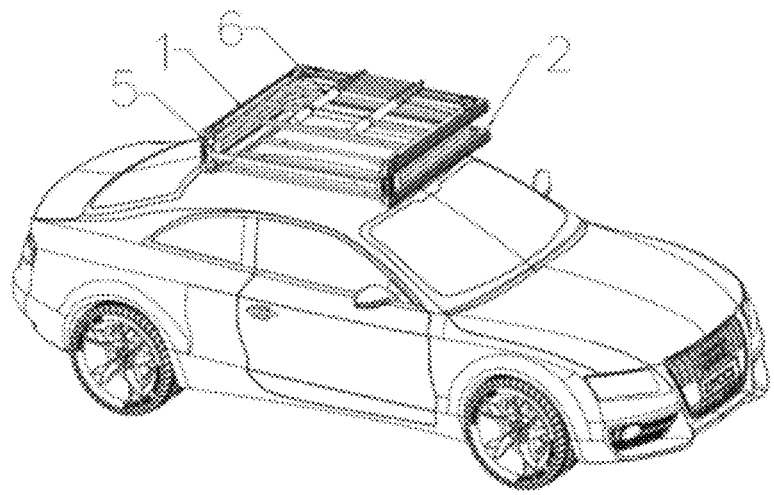
FIG. 5 is a schematic view of the folding vehicle roof top tent of the embodiment of the present application in a folded state.

In a preferable embodiment, a first stop mechanism is provided at the position where the main connection block is hinged to the first connection block and the second connection block, for limiting a maximum angle formed between the main connection block, the first connection block, and the second connection block in the unfolded state. The first stop mechanism limits the angle of the first connection block with respect to the second connection block and the main connection block within 180 degrees, as shown in FIG. 4, such that the movable base and the fixed base are positioned in the same horizontal plane, thus preventing toppling in use due to an unduly large angle (generally over 180 degrees) between the movable base and the fixed base. According to different requirements in use, the first stop mechanism can adopt a stop block, a stop lock screw, or stop structures cooperating with each other provided on the first connection block, the second connection block, and the main connection block.

Figure 6:
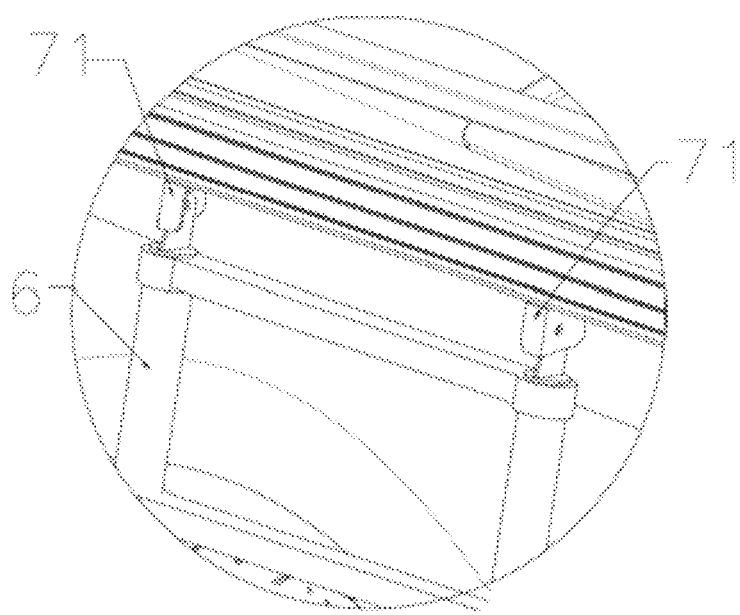
FIG. 6 is a schematic partial view of a telescopic ladder of the embodiment of the present application.

In a preferable embodiment, the retaining piece 7 provided on the other end of the movable base is further provided with a second stop mechanism for limiting the maximum angle between the telescopic ladder 6 and the movable base in the unfolded state. Preferably, referring to FIG. 6, the second stop mechanism is a stop piece 71. The stop piece 71 is able to stop and block the telescopic ladder 6, thus preventing the telescopic ladder 6 from toppling in use due to an unduly large expansion angle. In other embodiments, according to requirements in use, the second stop mechanism can also be a stop block, a stop lock screw or stop structures cooperating with each other provided on the telescopic ladder and the movable base.

In a preferable embodiment, the fixed base is fixed on the vehicle roof top through a fixture; the fixture is provided with a sliding rail; and the fixed base can slide on the sliding rail and can be fixed in position by a lock mechanism. By sliding the fixed base on the sliding rail, the position where the fixed base is fixed can be changed so as to adapt to vehicles of different types; moreover, the extension of the movable base beyond the vehicle body in the unfolded state can be further adjusted through the adjustment of the position of the fixed base.

In a preferable embodiment, both the first connection block and the second connection block are provided with a telescopic mechanism for adjusting the length of the tent in the unfolded state. By means of the telescopic mechanisms on the first connection block and the second connection block, a user can further adjust the length of the tent in the unfolded state according to his/her own characteristics or vehicle types.

The telescopic mechanism comprises a first plug 56 of the first connection block 53, a second plug 55 of the second connection block 52, a first receiving hole 59 of the fixed base 2 and a second receiving hole 60 of the movable base 1 and screw fasteners 58, the first and second plugs 56, 55 are movable to plug into the first and second holes 59, 60 respectively, then the screw fasteners 58 fix the first plug 56 with the first hole 59 together, the second plug 55 with the second hole 60 together.

It can be understood by persons of ordinary skill in the art that the discussion above on any embodiment is only exemplary, and it is not intended to imply that the scope of the present disclosure (including the claims) is limited to these examples. With the ideas of the present application, the above-stated embodiments or the technical features in different embodiments can be combined, and there are many other variations in different aspects of the present application as mentioned above, which are not provided in detail for simplicity. Therefore, any omissions, modifications, equivalent replacements, improvements, etc., made within the spirit and principle of the present application shall be contained within the scope of protection of the present application.

What is claimed is:

1. A folding vehicle roof top tent comprising:
   a movable base, a fixed base, a support, a tent cloth, a connection block means, a telescopic ladders and a telescopic mechanism for adjusting the length of the folding vehicle roof top tent in the unfolded state
   the fixed base is fixed to a vehicle roof,
   the connection block means comprises a first connection block, a second connection block and a main connection block, the first connection block connects the fixed base with the main connection block, the second connection block connects the movable base with the main connection block, wherein both the first connection block and the second connection block are hinged to the main connection block;
   the telescopic mechanism comprises a first plug of the first connection block, a second plug of the second connection block, a first receiving hole of the fixed base and a second receiving hole of the movable base and screw fasteners, the first and second plugs are movable to plug into the first and second holes respectively, then the screw fasteners fix the fist plug with the first hole together, the second plug with the second hole together;
   the support is hinged to the main connection block;
   the tent cloth covers the support in a fixed manner, and bottom edges of the tent cloth are fixedly connected to the fixed base and the movable base simultaneously;
   the telescopic ladder is hinged to an end of the movable base.

2. The folding vehicle roof top tent according to claim 1, wherein the support comprises at least three U-shaped aluminum-alloy tubes; a support mounting base is provided on the main connection block; and an end portion of the U-shaped aluminum-alloy tube is hinged to the support mounting base through a plastic sleeve.

3. The folding vehicle roof top tent according to claim 1, wherein one end of the movable base is provided with a retaining piece, and one end of the telescopic ladder is hinged to the retaining piece; and the retaining piece is further provided with a stop mechanism for limiting a maximum angle between the telescopic ladder and the movable base in the unfolded state.

* * * * *